United States Patent [19]

Ishizeki

[11] Patent Number: 5,005,405
[45] Date of Patent: Apr. 9, 1991

[54] METHOD OF TESTING AN ANTI-LOCK BRAKE CONTROL SYSTEM OF A MOTOR VEHICLE

[75] Inventor: Seiichi Ishizeki, Tokyo, Japan

[73] Assignee: Fuji Jukogyo Kabushiki Kaisha, Tokyo, Japan

[21] Appl. No.: 464,689

[22] Filed: Jan. 16, 1990

Related U.S. Application Data

[63] Continuation of Ser. No. 304,175, Jan. 31, 1989, abandoned.

[30] Foreign Application Priority Data

Feb. 3, 1988 [JP] Japan ................... 63-23528

[51] Int. Cl.⁵ ............................. G01L 5/28
[52] U.S. Cl. ................................ 73/123
[58] Field of Search ............ 73/4 R, 118.1, 121, 73/129, 168, 123; 340/52 R, 52 B; 303/92; 364/4, 62.02

[56] References Cited

U.S. PATENT DOCUMENTS

| 4,041,470 | 8/1977 | Slame et al. ........... 246/169 R |
| 4,192,180 | 3/1980 | Gerstenmeier et al. ........ 73/121 |
| 4,719,796 | 1/1988 | Zemker ....................... 73/121 |
| 4,780,818 | 10/1988 | Kubo ............................ 303/95 |

FOREIGN PATENT DOCUMENTS

| 2147724 | 4/1973 | Fed. Rep. of Germany ........ 303/92 |
| 2701159 | 7/1978 | Fed. Rep. of Germany ........ 303/92 |
| 2723847 | 12/1978 | Fed. Rep. of Germany ........ 303/92 |
| 2841211 | 4/1980 | Fed. Rep. of Germany ........ 303/92 |
| 1090600 | 5/1984 | U.S.S.R. ...................... 73/121 |

Primary Examiner—Robert Raevis
Attorney, Agent, or Firm—Beveridge, DeGrandi & Weilacher

[57] ABSTRACT

A method of testing the performance of an anti-lock brake control system of the type wherein an electronic control circuit signals each modulator to increase, decrease, or hold the hydraulic fluid pressure on the corresponding wheel brake as required by the varying wheel speed. The method dictates the sequential delivery of quasi brake control signals from the control circuit to the respective modulators, each signal being capable of causing an increase, a decrease and a holding of the fluid pressure on one brake. The resulting braking forces being exerted on the respective vehicle wheels are measured as by a dynamometer connected to motored rollers under the vehicle wheels.

1 Claim, 3 Drawing Sheets

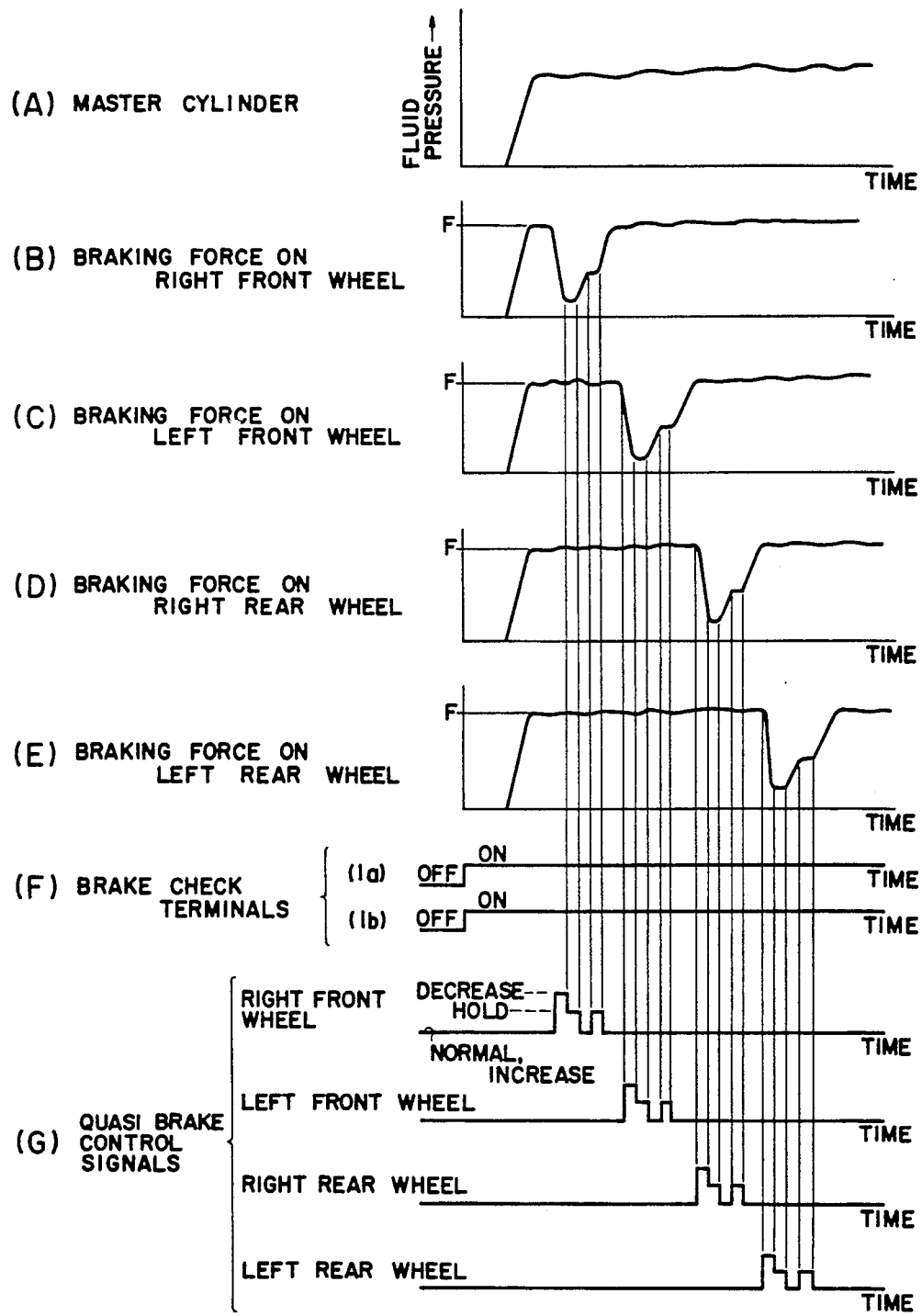
F I G. 2

METHOD OF TESTING AN ANTI-LOCK BRAKE CONTROL SYSTEM OF A MOTOR VEHICLE

This is a continuation of U.S. Ser. No. 07/304,175, filed Jan. 31, 1989, now abandoned.

BACKGROUND OF THE INVENTION

This invention relates to a method of testing the proper functioning of an anti-lock brake control system which is incorporated with a motor vehicle hydraulic brake system for automatically controlling the degree of rotational anti-lock during braking.

Hydraulic brake systems of motor vehicles are usually equipped with some form of anti-lock brake control system, referred to as the antiskid system in common parlance, in order to prevent wheel lockup during braking. Should the brakes lock the vehicle wheels, they would begin to skid. Generally, in hydraulic brake systems, brake fluid is sent from a master cylinder to wheel cylinders at respective vehicle wheels upon application of a brake pedal. The wheel cylinders act to slow down or stop the wheel speed which in turn slow or stop the vehicle. The anti-lock brake control system includes a set of wheel speed sensors, one for each vehicle wheel. The control system automatically decreases, holds or increases the fluid pressures in the wheel cylinders as dictated by the varying speeds of the vehicle wheels.

Several methods have been suggested for testing, or detecting or diagnosing troubles in, hydraulic anti-lock brake control systems. Japanese Patent Laid-Open Publication No. 59-184052 represents one such known method, which is for a system that controls brake fluid in response to the lowest of sensed wheel speeds. This prior art method detects fluid pressure oscillations taking place within the wheel cylinders due to the operation of the anti-lock brake control system in response to quasi wheel speed signals, with the vehicle held at a standstill. The method makes possible the confirmation of the fact that the control system remains inactive during normal braking, but that the control system positively operates as required in response to the lowest of the wheel speeds.

An objection to this prior art is that it necessitates the provision of means for sensing the fluid pressure oscillations within the wheel cylinders. An additional objection arises in the case where the test equipment is constructed as an independent, portable unit. In that case the pressure oscillation sensors attached to the wheel cylinders must be electrically connected to the pilot lamp circuit included in the separate test equipment.

Japanese Patent Laid-Open Publication No. 61-36008 proposes an anti lock brake control system with a self-diagnostic capability. A switch for starting the self-diagnosis of the system is disposed within easy access from the vehicle driver. A simple actuation of the start switch does not actually start the self-diagnosis, however, unless some additional input conditions are met. Thus the control system is protected against any accidental commencement of the procedure during vehicle travel even though the start switch itself is capable of ready actuation by the driver.

However, this prior art system is also unsatisfactory in that it permits self-diagnosis of only the arithmetic and logic operations of the electronic control circuitry. The system is incapable of detecting troubles in the actual function of the whole control system.

SUMMARY OF THE INVENTION

The present invention overcomes the weakness of the prior art and provides a simple, reliable, and readily practicable method of testing a motor vehicle anti-lock brake control system with a view to the accurate detection of troubles in modulator valves and other parts of the system.

In summary, the testing method of the invention is intended for an anti-lock brake control system of a motor vehicle having a set of brakes, one at each vehicle wheel, operated from a controllably actuated source of hydraulic fluid pressure via modulators. The control system includes an electronic control circuit for signaling each modulator to increase, decrease, or hold the fluid pressure on the corresponding brake as required by the sensed varying speed of the corresponding vehicle wheel.

According to the testing method of the invention there is built into the contrOl circuit a quasi brake control signal generator circuit capable of generating a set of quasi brake control signals which, by being applied to the respective modulators, are each capable of causing an increase, a decrease, and a holding of the fluid pressure on one brake in a prescribed order. The quasi brake control signals are successively applied from the control circuit to the modulators so as to cause the increase and decrease and holding of the fluid pressures on the set of brakes in a predetermined sequence. The resulting braking forces exerted by the brakes on the respective vehicle wheels are measured to determine if the braking forces are within allowable ranges of deviations of preset values. If the braking force are within the range, it follows that the modulators are functioning properly. The test of the present invention also can detect the presence or absence of flaws in the piping and wiring of the brake control system.

The invention is based upon the fact that motor vehicles fresh from the assembly line are on dynamometer rollers of the brake test stand regardless of whether they are equipped with anti-lock brake control systems or not. The method of the invention is readily practicable by use of the existing brake test equipment, as will become understood from the subsequent detailed description. The control circuit is thus prevented from accidental initiation into the brake check mode during vehicle travel.

The above and other features and advantages of this invention will become best be understood, from a study of the following description and appended claims, with reference had to the attached drawings showing a preferred mode of carrying out the invention.

BRIEF DESCRIPTION OF THE DRAWINGS

In the accompanying drawings:

FIG. 2, consisting of (A) through (G), is a timing diagram explanatory of how the anti lock brake control system is tested by the method of the invention;

DETAILED DESCRIPTION OF THE INVENTION

Figure 1:
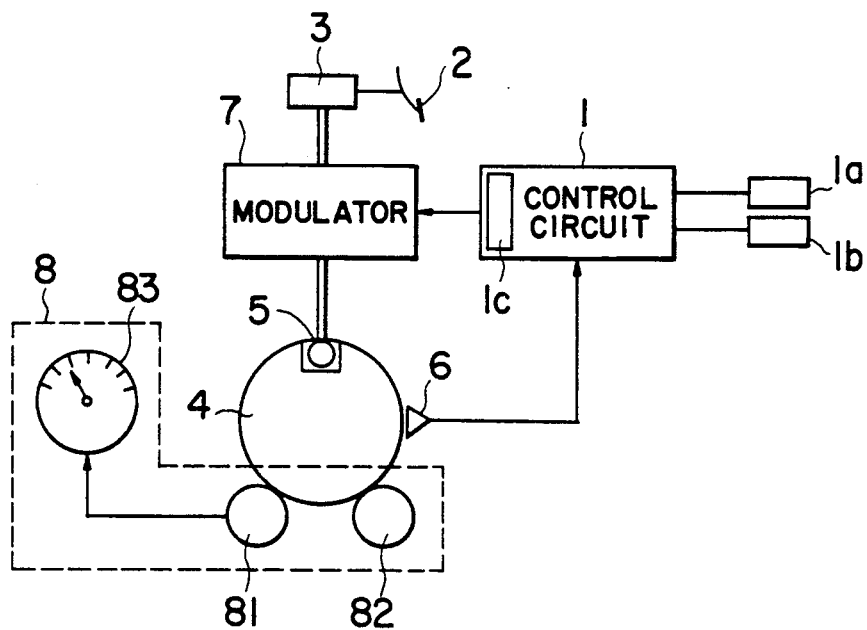
FIG. 1 is a block diagram of a motor vehicle anti-lock brake control system shown together with means for testing its performance by the method of the invention.

The invention will now be described more specifically in conjunction with the motor vehicle anti-lock brake control system illustrated diagrammatically in FIG. 1. Seen at 1 in this diagram is an electronic control circuit, known as the logic controller to the automotive specialists, for automatically controlling the amount of rotational anti-lock during braking. A brake pedal 2 is mechanically linked to a master cylinder 3. As is well known, the master cylinder 3 sends hydraulic brake fluid under controlled pressure to individual fluid-operated brakes 5 on respective vehicle wheels 4 upon application of the brake pedal 2. FIG. 1 shows only one of the four vehicle wheels 4, together with the associated brake 5 thereon for simplicity. It is understood that the other unshown brakes on the other unshown wheels are controlled in a like manner.

Electrically connected to the control circuit 1 is a modulator 7 interposed between master cylinder 3 and each wheel brake 5. The modulator 7 includes valves, not shown, for increasing, decreasing, and holding the fluid pressure on the associated wheel brake 5 in response to signals from the control circuit 1.

Figure 4:
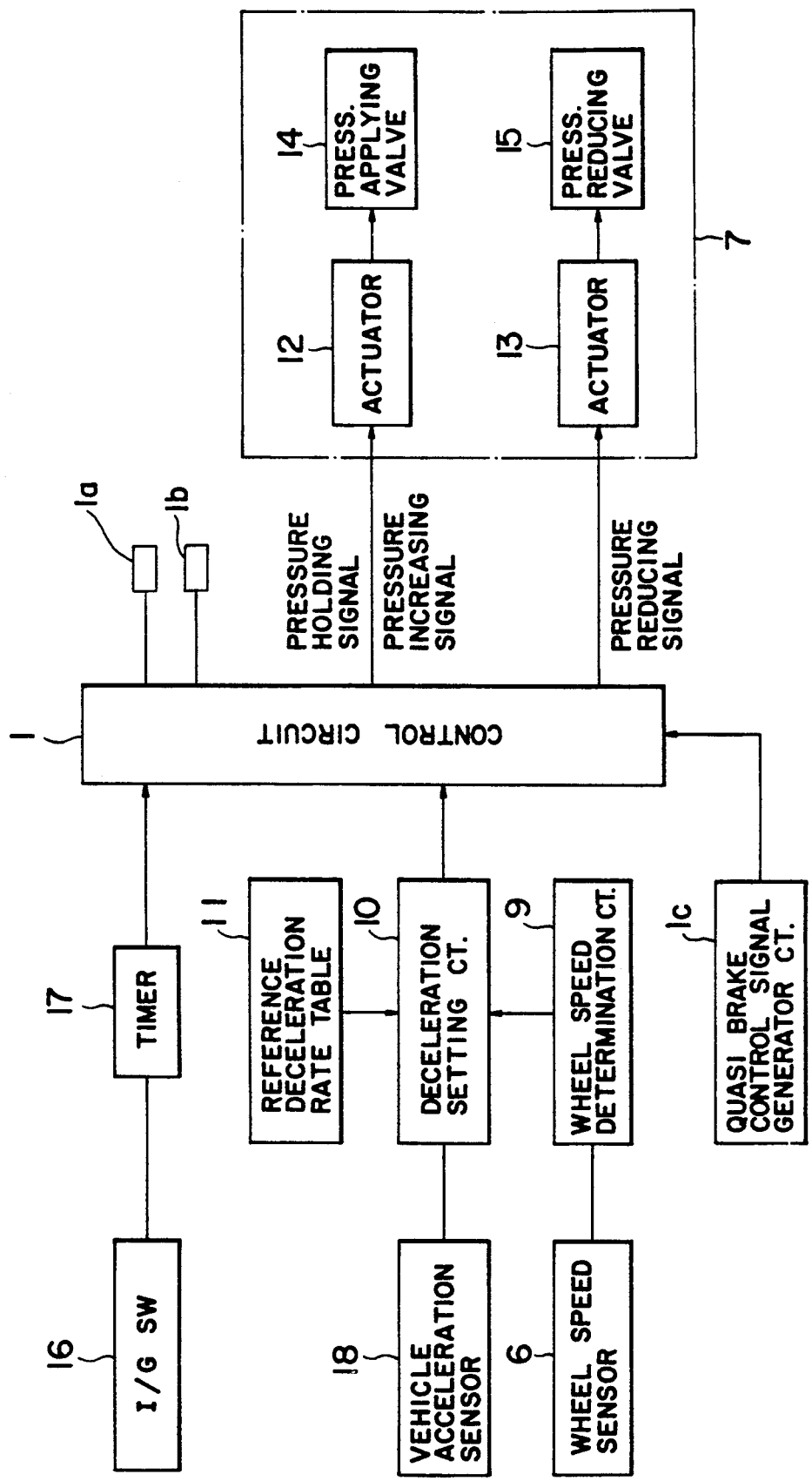
FIG. 4 is a schematic block diagram of the anti-lock brake control system.

Referring to FIG. 4 showing a schematic illustration of the anti-lock brake control system, the signal of the wheel speed detected by the wheel speed sensor 6 is sent to a wheel speed determination circuit 9 from which a wheel speed signal is sent to a deceleration setting circuit 10 in which the wheel speed signal is compared with a reference deceleration table 11 to thereby determine a constant to be multiplied with the value of the wheel speed signal. The value of the output control signal from the deceleration setting circuit 10 is thus determined and delivered to a control circuit 1, which is activated by signal from the vehicle acceleration sensor (G-sensor) 18.

Thus, pressure holding, increasing and/or reducing signals are delivered from the control circuit 1 to actuator 12 or 13 to actuate a pressure applying valve 14 or a pressure reducing valve 15 of the modulator 7.

On the other hand, I/G switch 16 and timer 17 are connected to the control circuit 1.

When the vehicle wheels are braked by application of the brake pedal 2, each wheel speed sensor 6 receives a wheel speed signal indicative of the resulting deceleration of the associated wheel 4. The control circuit 1 responds to the wheel speed signal when the wheel deceleration reaches a predetermined limit, by signaling the modulator 7 to hold the corresponding wheel brake 5 under constant fluid pressure by holding a pressure applying valve 14. If the wheel speed further drops thereafter, the control circuit 1 again signals the modulator 7 to decrease the pressure on the wheel brake 5 by releasing a pressure reducing valve 15. Then, as the wheel deceleration decreases to a predetermined minimum, the control circuit 1 resignals the modulator 7 to again hold the wheel brake 5 under constant fluid pressure. The wheel speed may then build up as a result of reaction from the road and come close to the vehicle velocity. Thereupon the control circuit 1 resignals the modulator 7 to incrementally increase the fluid pressure on the wheel brake 5 by opening the pressure applying valve 14.

Thus, essentially, the hydraulic fluid pressure on each wheel brake is cyclically increased and decreased as required by actual wheel speeds for optimum vehicle braking. The braking control method as so far described is, however, conventional in the art, and therein lies no feature of the invention.

As is also familiar to the specialists, the control circuit 1 is conventionally equipped for self diagnosis of the anti-lock brake control system. It can automatically detect troubles such as wire breakage and short circuiting that may take place in the various parts of the system. In the event of such trouble the control circuit deenergizes the coil of a fail-safe relay, not shown thereby electrically disconnecting the modulator 7 from its unshown power supply. Automatic braking control against wheel lockup is now disabled to preclude control errors due to the trouble. Thereafter the brake fluid is fed directly from the master cylinder 3 to the wheel brakes 5 for direct braking.

There are, however, some brake troubles that have not been detectable by the self-diagnosis of the conventional control system. Such troubles include the malfunctioning of the hydraulic valves, such as the valve 14 and the valve 15, built into the modulators for controlling the fluid pressures on the wheel cylinders, and the loss or diminution of mechanical brake control functions due to flaws in the piping of the hydraulic circuit or in the wiring of the electric circuitry.

The present invention provides an improved brake check method that overcomes weakness of the prior art. The method of the invention requires the connection of two brake check terminals $1a$ and $1b$ to the control circuit 1. Also required is a quasi brake control signal generator circuit $1c$ within the control circuit 1.

As the name implies, the quasi brake control signal generator circuit $1c$ generates a set of quasi brake control signals, plotted at (G) in FIG. 2, for delivery to the respective modulators 7 for the four wheel brakes 5 at constant time intervals of, say, one minute. It will be observed as indicated at (G) from FIG. 2 that each quasi brake control signal is waveshaped to sequentially decrease, hold, and increase the fluid pressure applied to the corresponding wheel brake 5. Further the set of four quasi brake control signals are timed to decrease, hold, and increase the fluid pressures on the four wheel brakes 5 in a predetermined sequence. This sequence may, for instance, be the right front wheel brake, the left front wheel brake, the right rear wheel brake, and the left rear wheel brake.

Additionally, the method of the invention necessitates the use of a known brake tester shown enclosed in the dashed outline in FIG. 1 and generally designated 8. The brake tester 8 comprises a pair of motored rollers 81 and 82 for each vehicle wheel, and a dynamometer 83 coupled to the rollers. The motored rollers 81 and 82 are placed more or less at a floor level, so that the vehicle can be driven onto these rollers for simulation of road tests. The dynamometer 83 measures and indicates the braking force being exerted on each vehicle wheel 4, from the reactive force of the rollers 81 and 82.

Figure 3:
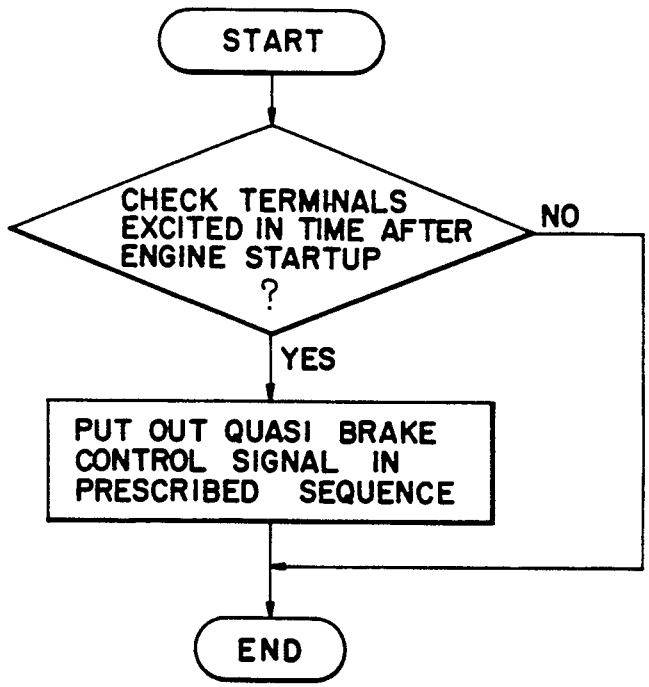
FIG. 3 is a flow chart explanatory of the sequential steps of the testing method of the invention.

Reference may be had to the timing diagram of FIG. 2 and the flow chart of FIG. 3 for the following detailed discussion of the brake check method of the invention.

With the motor vehicle placed on the brake tester 8, the motored rollers 81 and 82 are set into rotation with the vehicle wheels 4 in rolling engagement therewith. Then, the vehicle operator may actuate the brake pedal 2 thereby causing the master cylinder 3 to send the hydraulic brake fluid to all the brakes 5 on the vehicle wheels 4. The brake pedal 2 may be applied to such an extent that the dynamometer 83 indicates a constant braking force of, say, 100 kilogram force. The constant braking force thus applied to all the vehicle wheels is designated F at (B) through (E) in FIG. 2.

Then, as indicated at (F) in FIG. 2, the two brake check terminals 1a and 1b of the control circuit 1 are simultaneously supplied by power within a predetermined time (e.g. 10 seconds) after the startup of the vehicle engine, shown in FIG. 4, by the actuation of the ignition switch 16. The brake check terminals 1a and 1b are supplied with a 12 volt. The simultaneous excitation of the brake check terminals initiates the control circuit 1 into a brake check mode. So initiated into the brake check mode, the control circuit 1 starts delivery of the quasi brake control signals from its built-in generator circuit 1c to the modulators 7 in the predetermined sequence. In this case as described above, 12 volt is supplied to the terminals 1a and 1b after the braking force is applied. However, 12 volt may be supplied before applying the braking force as shown in FIG. 2.

First, as an example the right front wheel brake is tested. The modulator 7 corresponding to this brake is actuated by the quasi brake control signal for decreasing, holding, and increasing the fluid pressure on the right front wheel brake. Consequently, as represented at (B) in FIG. 2, the braking force on the right front wheel varies correspondingly. The dynamometer 83 measures and indicates these variations of the braking force.

If each variation of the braking force is within an allowable range of deviations from a preset value, it follows that the valves 14 or 15 for the right front wheel brake are faultless. It also proves that there are no flaws in the wiring and piping associated with the right front wheel brake.

Then the left front wheel brake, the right rear wheel brake, and the left rear wheel brake are similarly tested by consequent applications of the quasi brake control signals indicated at (G) in FIG. 2 to the corresponding modulators at the predetermined time intervals. Possible troubles with the valves 14 or 15 and the wiring and piping for these brakes can be detected from the dynamometer indications of the braking forces given at (C), (D) and (E) in FIG. 2. FIG. 3 shows that the brake check procedure of the control circuit 1 comes to an end upon delivery of all the quasi brake control signals.

It is understood that the foregoing description represents but one of many possible methods of carrying out the brake testing method of the invention. Various modifications or alterations may be made in the details of this disclosure without, departing from the scope of the invention.

What is claimed is:

1. A method of testing an anti-lock brake control system for a motor vehicle mounted on a test stand having rollers to support each of a plurality of wheels and a dynamometer to measure and indicate a braking force, the vehicle having brakes for applying said braking force to each of said plurality of wheels, a hydraulic pressure source in said anti-lock brake control system for providing a hydraulic fluid to said brakes, modulators connected between said hydraulic pressure source and each of said brakes for modulating said braking force, wheel speed sensors for detecting a revolutional speed of said plurality of wheels and for producing wheel speed signals, and a control circuit responsive to said wheel speed signals for controlling said braking force to said plurality of wheels, the method of testing said anti-lock brake control system which comprises the steps of:

turning said plurality of wheels by said rollers at a predetermined speed on said test stand;

depressing a brake pedal to keep said braking force indicated on said dynamometer to a predetermined constant value;

generating a set of quasi brake control signals representing a predetermined sequence of increasing, decreasing and holding said braking force in said control circuit;

delivering said set of the quasi brake control signals to each of said modulators in a predetermined order of one by one within a set time period so as to cause the increase, decrease and holding of said braking force in said predetermined sequence; and checking whether variation of said braking force indicated on said dynamometer is within an allowable range of deviations from said predetermined constant value.

* * * * *